US007010754B2

(12) United States Patent
Breuer

(10) Patent No.: US 7,010,754 B2
(45) Date of Patent: Mar. 7, 2006

(54) METHOD, SYSTEM AND USER INTERFACE FOR INPUTTING AND MANIPULATING TOKENIZED STRINGS

(75) Inventor: Matthias Breuer, Seevetal (DE)

(73) Assignee: Sun Microsystems, Inc., Santa Clara, CA (US)

( * ) Notice: Subject to any disclaimer, the term of this patent is extended or adjusted under 35 U.S.C. 154(b) by 289 days.

(21) Appl. No.: 09/728,556

(22) Filed: Nov. 30, 2000

(65) Prior Publication Data

US 2001/0012007 A1    Aug. 9, 2001

(30) Foreign Application Priority Data

Dec. 14, 1999    (EP) .................................. 99124949

(51) Int. Cl.
*G06F 3/00* (2006.01)
*G06F 7/00* (2006.01)
(52) U.S. Cl. ...................... 715/776; 715/841; 715/853; 707/3; 707/100
(58) Field of Classification Search ................ 345/721, 345/739, 766, 776, 777, 821, 823, 853, 854, 345/838; 707/100, 3; 715/721, 739, 776, 715/853, 854, 841
See application file for complete search history.

(56) References Cited

U.S. PATENT DOCUMENTS

| 5,388,196 | A | * | 2/1995 | Pajak et al. ................. 345/751 |
| 5,623,679 | A | * | 4/1997 | Rivette et al. ............... 715/526 |
| 5,632,022 | A | * | 5/1997 | Warren et al. ............... 345/776 |
| 5,937,163 | A | * | 8/1999 | Lee et al. .................... 345/853 |
| 5,956,736 | A | | 9/1999 | Hanson et al. .............. 707/513 |
| 5,963,205 | A | * | 10/1999 | Sotomayor ................... 715/531 |
| 6,018,749 | A | * | 1/2000 | Rivette et al. ............... 715/525 |
| 6,275,142 | B1 | * | 8/2001 | Paleiov et al. .............. 345/156 |
| 6,539,387 | B1 | * | 3/2003 | Oren et al. .................. 707/100 |

FOREIGN PATENT DOCUMENTS

JP    11 296507 A    10/1999

OTHER PUBLICATIONS

Anon.: "Net Objects FUSION Version 3.0 for Windows User Guide", Net Objects, pp. 8-1 through 8-19, US, XP002137906.

* cited by examiner

*Primary Examiner*—Ba Huynh
*Assistant Examiner*—Truc T. Chuong
(74) *Attorney, Agent, or Firm*—Gunnison, McKay & Hodgson, L.L.P.; Forrest Gunnison

(57) ABSTRACT

A computer-based method of interactively generating an index page displays a window including a list of index page types. Upon selection of one index page type in the list of index page types, a window including a list of index line types is displayed. Upon selection of one index line type in the list of index line types, a token string including a plurality of tokens is displayed. The plurality of tokens includes only tokens appropriate for the one index line. Upon selection of one token, or alternatively a window for entering content associated with the one token, user selectable attributes for the content associated with the at least one token are displayed.

22 Claims, 5 Drawing Sheets

Contents

Summary .................................................................. 5

1.   Mechanics ........................................................... 8
1.1  Solid bodies ........................................................ 9
1.1.1 Dynamics ........................................................... 9
   .
   .
   .

1.2  Fluids ............................................................. 14
   .
   .
   .

2.   Electricity ....................................................... 48
2.1  Electrostatics .................................................... 49
   .
   .
   .

METHOD, SYSTEM AND USER INTERFACE FOR INPUTTING AND MANIPULATING TOKENIZED STRINGS

BACKGROUND OF THE INVENTION

1. Field of the Invention

The present invention relates generally to computer generated documents and in particular to computer generated index documents.

2. Description of Related Art

For many documents created on a computer, like text documents, HTML documents, presentations and others, related index pages are useful in finding desired content within the document, or are useful in getting information about bibliographic sources or the like. Index documents include documents that in turn include any or all of a table of contents, a headword index, figure or table index as well as a bibliographic index, for example, which are referred to herein as an index page.

Creating an index page involves a lot of formatting work, and is therefore time consuming and costly. An index page typically has a plurality of index lines having a specific content and format. In an index page that is a table of contents of a book, for example, there exist index lines for different hierarchical levels of headings, i.e., main heading, sub-heading etc.

FIG. 1 shows an example of an index page 100 that is a table of contents of a textbook. Index page 100 has a plurality of index lines, which have different functions and are formatted differently.

The first index line is the title "Contents" followed by the index line "Summary" with page number 5. Next are three index lines representing hierarchies of headings. A table of contents like that shown in FIG. 1 is an example of an index page, where the index lines represent a different level in a hierarchical order within the index page.

Another example is a bibliographic index, which can contain a plurality of different types of information sources like books, journals, theses, e-mails, www-pages and so on. Different types of index lines, in this example, do not represent different hierarchical levels, but do represent different types of information sources.

It is known to define the content and format of an index line using a string of instruction symbols (tokens) and attributes associated with the tokens. In the following an example of a token string with corresponding attributes (in parenthesis) is provided for an index line of a table of contents, such as that in FIG. 1:

chapter number CH (character style); entry text ET (style template); tabulator TAB (type, filling character, position); page number PN (character style).

Typically, "chapter number" is represented by a numerical value, e.g., 1, 1.1, 1.3.5. "Entry text" is the chapter title and has a style defined by the style template. The tabulator filling character, e.g., a blank character or a dot, fills the space from the entry text to the page number. The tabulator has two other attributes, i.e., the tabulator type (centered, left, right) and a position measured in mm, inches or any other suitable metric. In most cases, the page number is positioned at the right side of the index line.

It is known to either input the token string directly by typing the instruction symbols and attribute values, or by using a user interactive menu dialog. These two methods are complicated and time consuming for the user. Furthermore, the problem arises that the syntax of tokens and attributes may be input incorrectly.

Arranging the tokens to define an order is particularly difficult to handle because tokens could be entered inside another token. Therefore, the computer program has to check the syntax of the input token string every time, and if the syntax is wrong, the token string has to be corrected by the user. Besides index pages other instruction sets, for example defining a modem interface, may have to be input into a computer with correct syntax.

SUMMARY OF THE INVENTION

According to the present invention, a method of interactively generating a computer readable instruction set having instruction symbols and related variables comprises:

a) generating a signal for displaying a list of selectable instruction symbols, b) arranging a selected instruction symbol to form part of the instruction set, c) generating a signal for displaying a list of selectable variable values, if at least one variable relates to the selected instruction symbol, d) arranging a selected variable value to form part of the instruction set, and e) repeating steps a) to d) until the instruction set is completed.

The instruction set may preferably define a formatted index document or database relating to another arbitrary document type.

In another embodiment, a computer-based method of interactively generating an index page displays a window including a list of index page types. Upon selection of one index page type in the list of index page types, a window including a list of index line types is displayed.

Upon selection of one index line type in the list of index line types, a token string including a plurality of tokens is displayed. The plurality of tokens includes only tokens appropriate for the one index line. Upon selection of one token, or alternatively a window for entering content associated with the one token, user selectable attributes for the content associated with the at least one token are displayed.

In one embodiment, index line types in the list of index line types represent different levels in a hierarchical order within the index page, and the list of index page types includes a table of contents. The list of index page types also includes a bibliographic index, and upon selection of the bibliographic index, the index line types in the list of index line types represent different sources of bibliographic information.

In one embodiment, the method of this invention is implemented using a computer-based graphic user interface comprising:

an insert index page dialogue window comprising:

an index page type window wherein the index page type window includes a list of index page types; and the index page type window displays at least one index page type in the list of index page types;

an index page title window coupled to the index page type wherein the index page title window displays a title for the at least one index page type;

an index line type window coupled to the index page type window wherein the index line type window includes a list of index line types for the at least one index page type; and a token string coupled to the index line type window wherein the token string includes a plurality of tokens and further wherein each token comprises an element in an index line type selected in the index line type window.

The method of this invention is also contained in a computer program product for interactively generating an index page dialogue window. The computer program product includes program code adapted for:

displaying a window including a list of index page types;

displaying a window including a list of index line types upon selection of one index page type in the list of index page types;

displaying a token string including a plurality of tokens, upon selection of one index line type in the list of index line types, wherein the plurality of tokens includes only tokens appropriate for the one index line type; and displaying, for at least one token in the plurality of tokens, user selectable attributes for data associated with the at least one token.

A system, according to this invention includes a processor and a memory coupled to the processor. Stored in the memory are computer instructions for a method of interactively generating an index page. Upon execution of the computer instructions on the processor, the method comprises:

displaying a window including a list of index page types;

displaying a window including a list of index line types upon selection of one index page type in the list of index page types;

displaying a token string including a plurality of tokens, upon selection of one index line type in the list of index line types, wherein the plurality of tokens includes only tokens appropriate for the one index line type; and displaying, for at least one token in the plurality of tokens, user selectable attributes for data associated with the at least one token.

In more general terms, one embodiment of the invention includes a user interface for inputting and manipulating tokenised strings such as those found on an index page. Furthermore, with this user interface, syntax errors in such strings can effectively be avoided.

BRIEF DESCRIPTION OF THE DRAWINGS

FIG. 1 is an illustrative example of a prior art index page.

In the drawings and in the following detailed description, elements with the same reference numeral are the same element. Also, the first digit of a reference numeral represents the number of the figure in which that element first appeared.

DETAILED DESCRIPTION

A method 230 (FIGS. 2 and 5), according to the present invention, allows a user to easily and conveniently generate each index line on an index page using a single user interface 295 that is displayed on monitor 216 of a computer system 200. Not only does each index line generated using interface 295 have a correct syntax, but also, the user is not required to use multiple different interfaces, e.g., a first interface to generate the index line and a second interface to edit portions of the index line.

Herein, an index page comprises a plurality of index lines, which have different functions and are formatted differently. An index page may include one or more physical pages of a document.

Although, the phrase "index line" is used here, an index line is not limited to a single line on the index page. In the sense of the present embodiment, an index line can actually comprise two or more physical lines of text that form a paragraph.

Formatting using graphic user interface 295, however, is carried out for every index line. An index line is therefore to be understood as a formatting unit. In most cases, like the example shown in FIG. 1, however, every index line is actually one text line.

As explained more completely below, user interface 295 of this invention includes all controls necessary for a user to easily generate each index line in an index page. Moreover, for each index line, the user is presented with a framework that is correct with respect to the hierarchical location of the index line within the index page, or with respect to the type of index line within the index page. In particular, upon selection of a particular type of index line, the user is presented only with tokens and data entry fields that are appropriate for the chosen type of index line.

No longer does the user have to worry about improper nesting of tokens used in formatting the various elements in an index line. In fact, unlike the prior art described above, no prior knowledge of the tokens or of attributes of the tokens is required, because the correct tokens, preferably in the correct locations, are presented in interface 295 for each element in the index line level selected by this user. In addition, if there are style or other attributes associated with a particular token, the user accesses these attributes from interface 295 and makes the desired selections. The user is unconcerned with encoding the order or format used to specify the attributes of a particular token.

Figure 3:
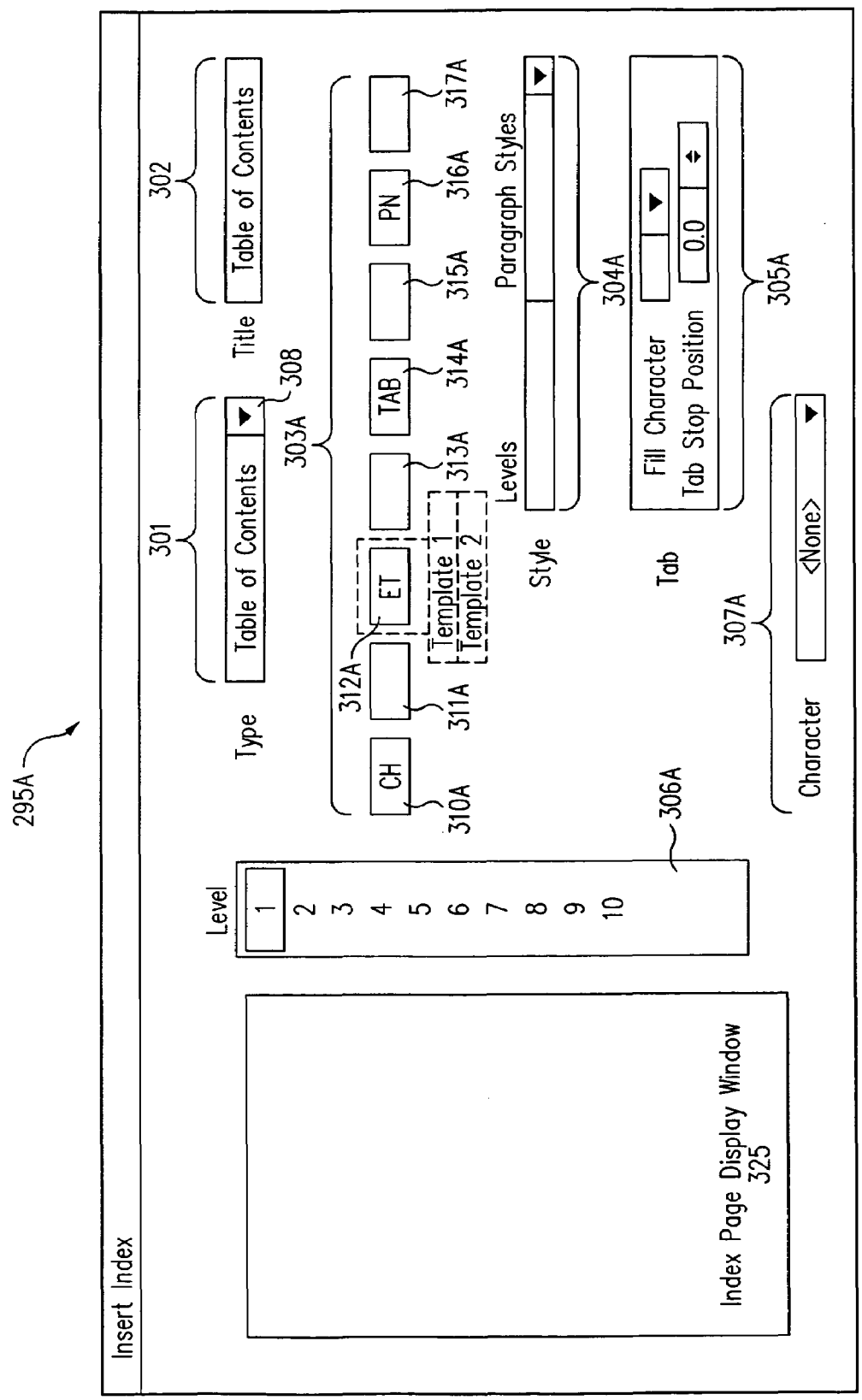
FIG. 3 is a schematic illustration showing an exemplary dialog window displayed on a display screen according to an embodiment of the present invention.

FIG. 3 is a more detailed diagram of one embodiment of graphic user interface 295. As discussed more completely below, graphic user interface 295 includes an index page dialogue window that in this embodiment includes a plurality of windows that are used to select and generate each index line in the index page. Various buttons are used to expand some of the windows in interface 295. In another embodiment, index page dialogue window 295 includes a plurality of overlain cards that each has a tab. When the user selects a particular tab, that card is moved to the front of window 295. The particular technique used to implement the features of interface 295 of this invention are not essential to the invention, and will vary depending upon the characteristics of the computer system in which the invention is used, and the methods used to implement the invention in that computer system.

In one embodiment, to generate index page dialogue window 295, the user first accesses an Insert icon in a tool bar of an application in which the user wants to create the index page. Upon accessing the Insert icon, the user is presented with a menu that includes an entry "Indexes." Upon selection of entry "Indexes," the user is presented with yet another menu that includes "Indexes," that the user in turn selects. In response to this last selection, the user is presented with one embodiment of graphic user interface 295, as illustrated in FIG. 3.

In this embodiment of graphic user interface 295, the user can select a type of the index page of interest to the user using index page type window 301. In this embodiment, the index page type choices include:

Table of Contents
Alphabetic Index
Illustration Index
Index of Tables
User-Defined
Table of Objects
Bibliography.

Figure 4:
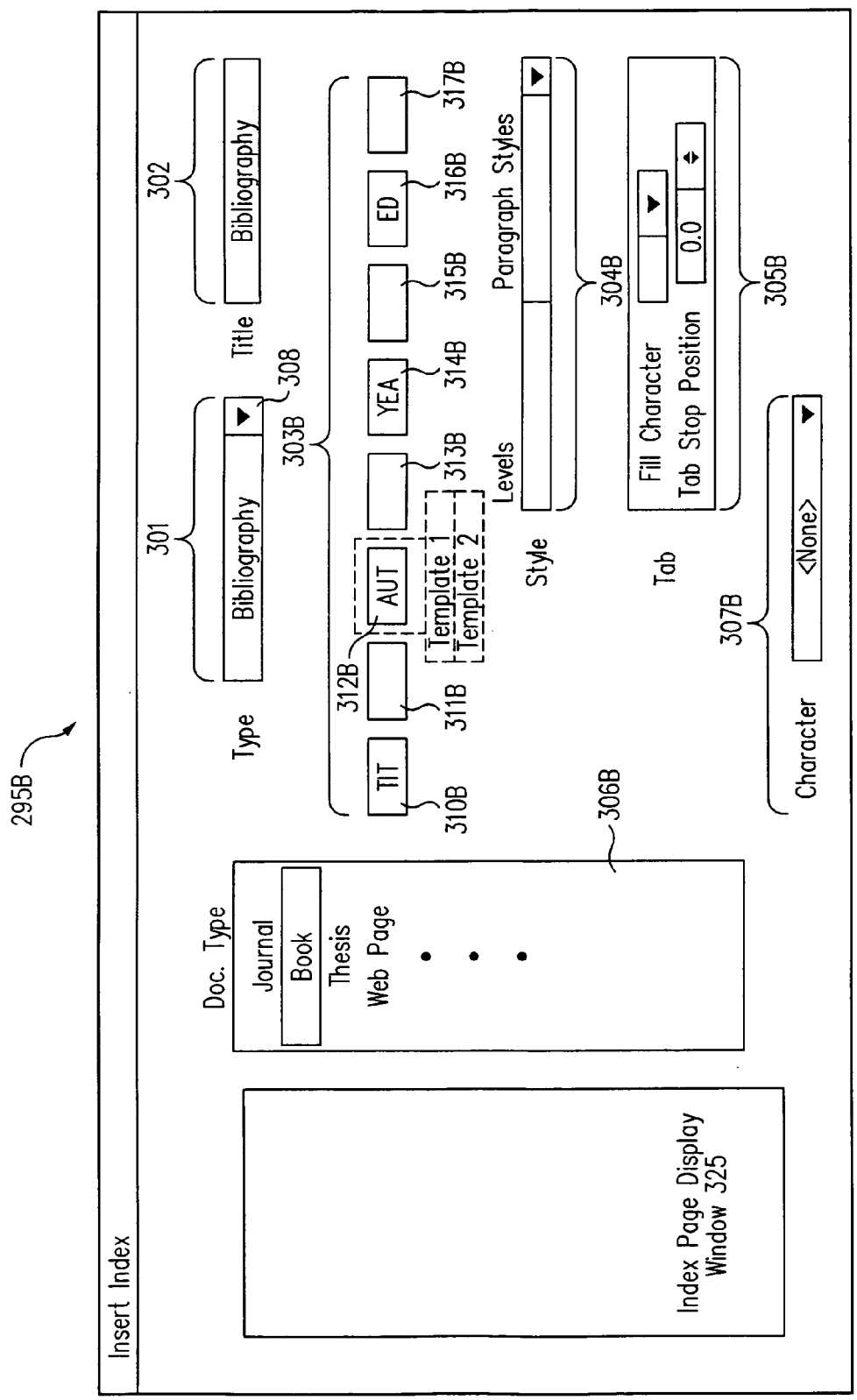
FIG. 4 is a schematic illustration of a dialog window displayed on a display screen according to another embodiment of the present invention.

The user selects a particular type of index page by clicking on button 308 and then selecting one type of index page from a list of index page types. Upon selection of the particular type of index page from this list, e.g., "Table of Contents" in FIG. 3, a default title for that index page is entered in index page title window 302. However, the user can replace the default title, by selecting title window 302 and inputting a new title. FIG. 4 is another embodiment of graphic user interface 295B in which the user selected an index page type of "Bibliography" in index page type window 301, and so the default title in title window 302 is "Bibliography".

Hence, in method 230 of this invention, display list of index page types operation 501 (FIG. 5) presents a list of index page types to the user upon activating button 308 in index page type window 301 of graphic user interface 295. From the list displayed in operation 501, a user selects one index page type from the list, e.g., "Table of Contents" in FIG. 3, and "Bibliography" in FIG. 4, in select index page type operation 502.

Upon the user selecting a particular index page type from the list in operation 502, graphic user interface 295 presents a list of index line types appropriate for the index page type selected in an index line type window. In FIG. 3, a list of hierarchical levels for the "Table of Contents" are presented in index line type window 306A that is labelled "Level" in this embodiment. In FIG. 4, a list of types of documents that typically are used in a bibliography are presented in index line type window 306B that is labelled "Doc. Type." The types of index lines illustrated in FIGS. 3 and 4 are illustrative only and are not intended to limit the invention to the specific types displayed. In view of this disclosure, one of skill in the art can implement index line types that are appropriate for each type of index page.

In select index line type operation 504, the user can select any desired index line type from those displayed in the index line type window, e.g., windows 306A (FIG. 3) and 306B (FIG. 4). In the example of FIG. 3, the user selects level "1" for index line type to be added to the Table of Contents in operation 504. In the example of FIG. 4, the user selects "Book" in operation 504 for the type of index line to add to the Bibliography.

Upon selection of a particular type of index line, display token string operation 505 displays, in user interface 295, a token string, e.g., token string 303A in FIG. 3 and token string 303B in FIG. 4, for the selected index line type. Specifically, in the example of the table of contents as shown in FIG. 3, four tokens CH (chapter) 310A, ET (entry text) 312A, TAB (tabulator) 314A and PN (page number) 316A are displayed. Associated with each of tokens 310A, 312A, 314A and 316A is a display field window 311A, 313A, 315A and 317A, respectively.

The tokens in an index line are instruction symbols for defining elements of the index line. Accordingly, the particular tokens and associated display field windows may be different for each index line of the index page. However, in a given index line type, the string of tokens includes only tokens that are appropriate for elements in that type of index line type, e.g., tokens that represent each element in that type of index line type.

By clicking on the respective display field window on the screen the user can then enter the corresponding content, e.g., "1.1.2" in window 311A for chapter token 310A, or "fluids" in window 313A for title token 313A, in insert content operation 506. In one embodiment, not only is the content displayed in the window for the token, but also the entire index line is displayed in index page display window 325.

Typically, each token has a default style for the information entered in the display field window for that token. However, in addition, upon selecting a token, display selectable attributes operation 507 displays attributes that the user can define or modify for the selected token.

For example, in one embodiment, for token ET (FIG. 3), the user could select, in select attributes operation 508, either template 1 or template 2 to define the attributes of the text entered. In another embodiment, the user can use style window 304A to select a paragraph style associated with the index line represented by token string 303A in select attributes operation 508. If the user selected token TAB, the user can utilize tab window 305A to select the tab stop position and the fill character inserted between the title and the page number in select attributes operation 508. Hence, in this embodiment, the attributes may include style templates, character styles selected in character style window 307A or 307B, or tabulator positions.

When a user selects either a particular token or a display field window for that token, only the attributes associated with the specific selection are enabled in window 295. Hence, for each token in an index line, only attributes that can be selected for that token are enabled in window 295 when that token is selected. Therefore, the user can easily select appropriate attributes for the element in the index line associated with the token.

The selection of attributes is further restricted to only valid values so that inputting of a token string having an incorrect instruction syntax is not possible. Similarly, the fields for inserting characters are only enabled if a character at the respective position is allowed.

Upon entering data for the selected token in operation 506 and selecting any attributes for the selected token in operation 508, all tokens check operation 509 determines whether the user has processed all the tokens in token string 303A. If all tokens have been processed, check operation 509 transfers to last index line check operation 510 and otherwise returns to select token and insert content operation 506. If the user has completed the index page, check operation 510 transfers to end and otherwise to select index line type operation 504.

Figure 5:
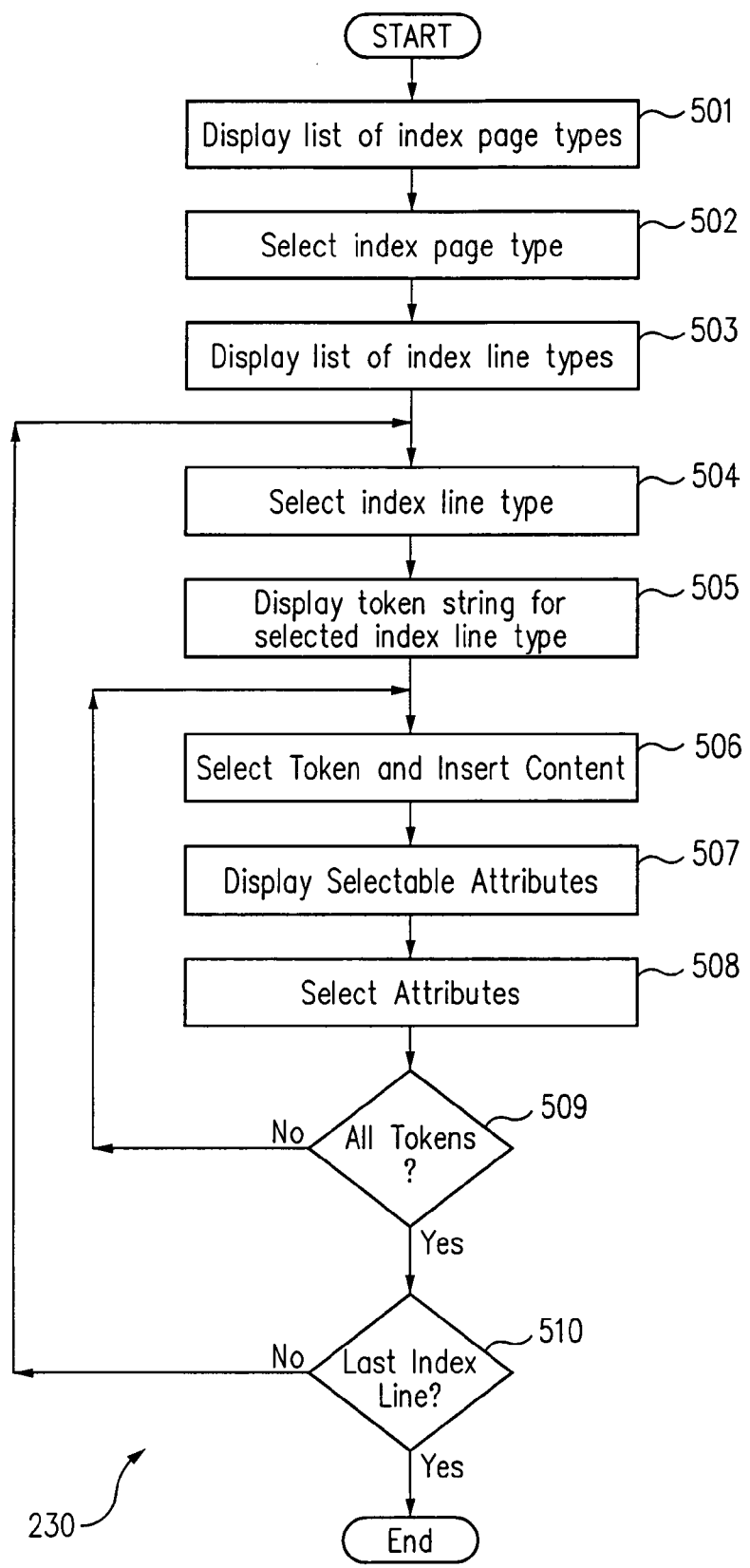
FIG. 5 is a flow chart schematically illustrating an embodiment of the present invention.

While check operations 509 and 510 are presented as sequential operations in FIG. 5, this is illustrative only and is not intended to limit the invention to this particular sequence of operations. As is known to those of skill in the art, an event handler is associated with a graphic user interface, and when an event occurs, the event handler determines what instruction the user has input, and branches to the appropriate action for that instruction.

Returning to FIG. 4, where index line type book was chosen, token string 303B include tokens TIT (title) 310B, AUT (author) 312B, YEA (year) 314B and ED (editor) 316B that are displayed in operation 505 upon selection of index line type book in operation 504. The user can now input title, author, year of publication, editor etc in operations 506 to 508. Displayed tokens 310B, 312B, 314B, and 316B are adapted to the chosen document type so that all necessary information can be input. In the case of a web page, for example, it is possible to insert tokens for a hyperlink to the referenced www-page. Also, notice that since token string 303B does not include a tabulator token, tabulator window 305B is greyed-out to indicate that this attribute is unavailable.

The index page may be assigned to a document presently opened in the computer or a defined portion thereof as, for example, a chapter or paragraph. The invention, however, is not restricted to the generation of index pages. Other types of instruction sets may also be created by the present invention. An example of such an instruction set is an instruction string containing AT-commands for a modem interface.

The interactive editing of the instruction set speeds up the generation or editing of the instruction set. In the case of a bibliographic index, for example, the user may enter a short name for a field like the author. If a corresponding entry does not exist in the bibliographic index, the user can then click on a button to create a new entry for the bibliography. The interactive entry of instruction symbols and variables furthermore can avoid the entry of instruction language that is not permitted. As a user builds or edits an index page, in one embodiment, the index page is displayed in index page display window 325.

Figure 2:
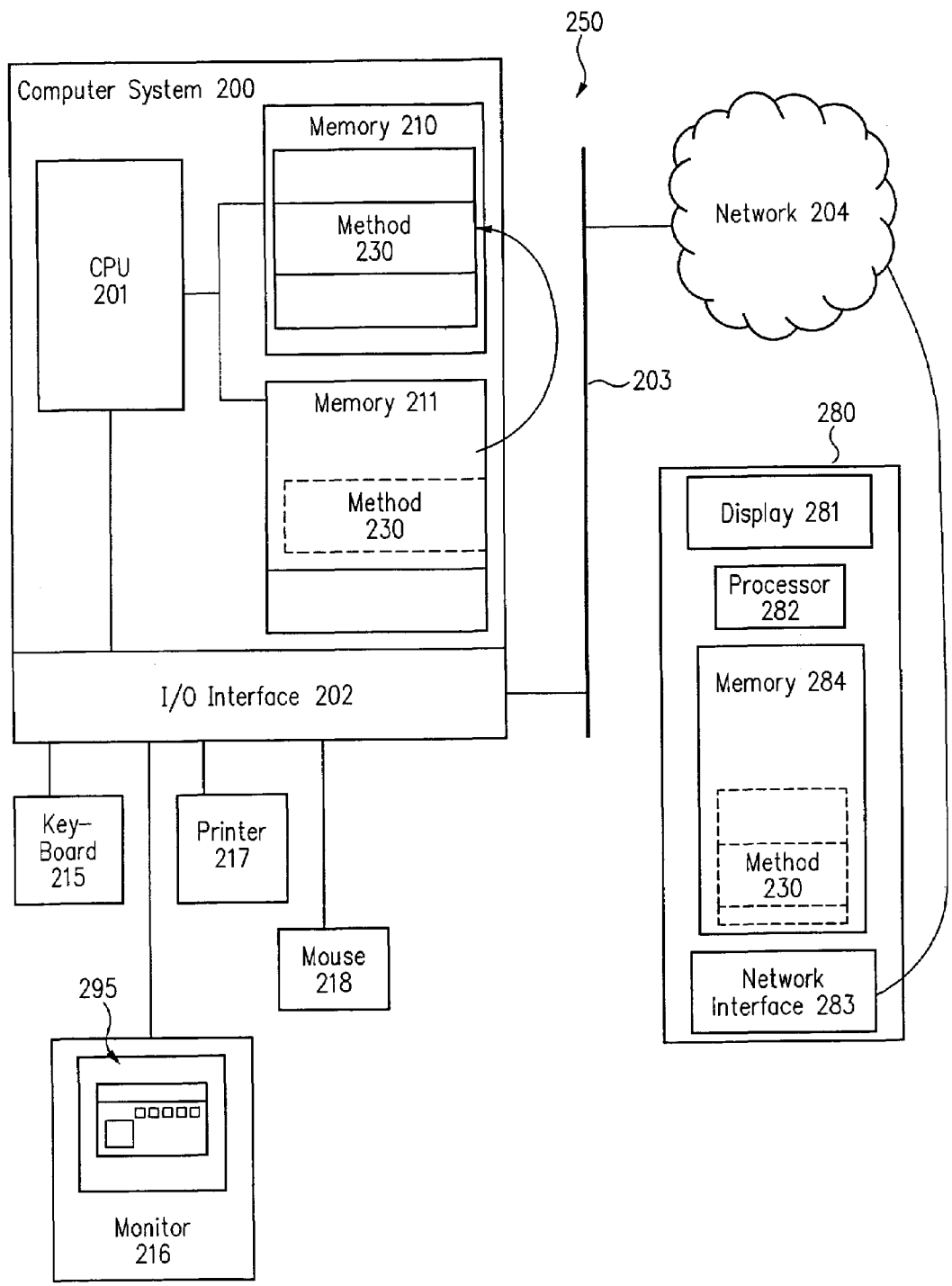
FIG. 2 is a block diagram of a computer system that includes the method of this invention.

In one embodiment, graphic user interface 295 is implemented using a hardware configuration like a personal computer or workstation as illustrated schematically in FIG. 2 by computer system 200. However, in another embodiment, graphic user interface 295 is implemented using a client-server configuration 250 that also is illustrated in FIG. 2. Graphic user interface 295 may be displayed on a display screen of client device 200 while some or all operations of method 230 are carried out on a server computer 280 accessible by the client device 200 over a data network 203 and 204, such as the Internet, using a browser application or the like.

Herein, a computer program product comprises a medium configured to store or transport computer readable code for method 230 or in which computer readable code for method 230 is stored. Some examples of computer program products are CD-ROM discs, ROM cards, floppy discs, magnetic tapes, computer hard drives, servers on a network and signals transmitted over a network representing computer readable program code.

As illustrated in FIG. 2, this storage medium may belong to computer system 200 itself. However, the storage medium also may be removed from computer system 200. For example, method 230 may be stored in memory 284 that is physically located in a location different from processor 201. The only requirement is that processor 201 is coupled to the memory containing method 230. This could be accomplished in a client-server system 250, e.g., system 200 is the client and system 280 is the server, or alternatively via a connection to another computer via modems and analog lines, or digital interfaces and a digital carrier line.

For example, memory 284 could be in a World Wide Web portal, while display unit 216 and processor 201 are in a personal digital assistant (PDA), or a wireless telephone, for example. Conversely, the display unit and at least one of the input devices could be in a client computer, a wireless telephone, or a PDA, while the memory and processor are part of a server computer on a wide area network, a local area network, or the Internet.

More specifically, computer system 200, in one embodiment, can be a portable computer, a workstation, a two-way pager, a cellular telephone, a digital wireless telephone, a personal digital assistant, a server computer, an Internet appliance, or any other device that includes the components shown and that can execute method 230. Similarly, in another embodiment, computer system 200 can be comprised of multiple different computers, wireless devices, cellular telephones, digital telephones, two-way pagers, or personal digital assistants, server computers, or any desired combination of these devices that are interconnected to perform method 230 as described herein.

Herein, a computer memory refers to a volatile memory, a non-volatile memory, or a combination of the two in any one of these devices. Similarly, a computer input unit and a display unit refer to the features providing the required functionality to input the information described herein, and to display the information described herein, respectively, in any one of the aforementioned or equivalent devices.

In view of this disclosure, method 230 can be implemented in a wide variety of computer system configurations. In addition, method 230 could be stored as different modules in memories of different devices. For example, method 230 could initially be stored in a server computer 280, and then as necessary, a module of method 230 could be transferred to a client device 200 and executed on client device 200. Consequently, part of method 230 would be executed on the server processor 282, and another part of method 230 would be executed on processor 201 of client device 200. In view of this disclosure, those of skill in the art can implement the invention of a wide variety of physical hardware configurations using an operating system and computer programming language of interest to the user. For example, FIG. 2 shows input devices 215 and 218, but other input devices, such as speech recognition software and/or hardware could be used to input the selections and data for method 230.

In yet another embodiment, method 230 is stored in memory 284 of system 280. Stored method 230 is transferred, over network 204 to memory 211 in system 200. In this embodiment, network interface 283 and I/O interface 202 would include analog modems, digital modems, or a network interface card. If modems are used, network 204 includes a communications network, and method 230 is downloaded via the communications network.

Method 230 of the present invention may be implemented in a computer program including comprehensive office application STAROFFICE that is available from Sun Microsystems, Inc. of Palo Alto, Calif. (STAROFFICE is a trademark of Sun Microsystems.) Such a computer program may be stored on any common data carrier like, for example, a floppy disk or a compact disc (CD), as well as on any common computer system's storage facilities like hard disks. Therefore, another embodiment of the present invention also relates to a data carrier for storing a computer program for carrying out the inventive method. Yet another embodiment of the present invention also relates to a method for using a computer system for carrying out the presented inventive method. Still another embodiment of the present invention further relates to a computer system with a storage medium on which a computer program for carrying out the presented inventive method is stored.

While the invention has been particularly shown with reference to a preferred embodiment thereof, it will be understood by those skilled in the art that various other changes in the form and details may be made therein without departing from the spirit and scope of the invention.

I claim:

1. A computer-based method of interactively generating an index page comprising:
    displaying a window including a list of index page types wherein said index page types include at least a table of contents and a bibliography;
    displaying a window including a list of index line types for one index page type upon selection of said one index page type in said list of index page types;
    displaying a token string including a plurality of tokens for one index line type, upon selection of said one index line type in said list of index line types, wherein said plurality of tokens includes only tokens appropriate for said one index line type; and
    displaying, for at least one token in said plurality of tokens, user selectable attributes for data associated with said at least one token.

2. The method of claim 1, wherein index line types in said list of index line types represent different levels in a hierarchical order within the index page.

3. The method of claim 2, wherein the list of index page types includes a table of contents.

4. The method of claim 1, wherein the list of index page types includes a table of contents.

5. (Original) The method of claim 1, wherein the list of index page types includes a bibliographic index.

6. The method of claim 5, wherein index line types in said list of index line types represent different sources of bibliographic information.

7. The method of claim 1, wherein the at least one token is a tabulator token and said user selectable attributes include tabulator positions.

8. A computer system comprising:
    a display unit having displayed thereon a computer-based graphic user interface comprising:
        an insert index page dialogue window comprising:
            an index page type window wherein said index page type window includes a list of index page types wherein said index page types include at least a table of contents and a bibliography; and said index page type window displays at least one index page type in said list of index page types;
            an index page title window coupled to said at least one index page type window wherein said index page title window displays a title for said at least one index page type;
            an index line type window coupled to said at least one index page type window wherein said index line type window includes a list of index line types for said at least one index page type; and
            a token string coupled to said at least one index line type window wherein said token string includes a plurality of tokens and further wherein each token comprises an element in an index line type selected in said index line type window.

9. The graphic user interface of claim 8, wherein index line types in said list of index line types represent different levels in a hierarchical order within the index page.

10. The graphic user interface of claim 9, wherein the list of index page types includes a table of contents.

11. The graphic user interface of claim 8, wherein the list of index page types includes a table of contents.

12. The graphic user interface of claim 8, wherein the list of index page types includes a bibliographic index.

13. The graphic user interface of claim 12, wherein index line types in said list of index line types represent different sources of bibliographic information.

14. The graphic user interface of claim 8, wherein at least one token in said plurality of tokens is a tabulator token and user selectable attributes include tabulator positions.

15. A computer program product for interactively generating an index page dialogue window, the computer program product comprising program code embodied in a tangible medium wherein execution of said program code results in a method comprising:
    displaying a window including a list of index page types wherein said index page types include at least a table of contents and a bibliography;
    displaying a window including a list of index line types for one index page type upon selection of said one index page type in said list of index page types;
    displaying a token string including a plurality of tokens for one index line type, upon selection of said one index line type in said list of index line types, wherein said plurality of tokens includes only tokens appropriate for said one index line type; and
    displaying, for at least one token in said plurality of tokens, user selectable attributes for data associated with said at least one token.

16. The computer program product of claim 15, wherein index line types in said list of index line types represent different levels in a hierarchical order within the index page.

17. The computer program product of claim 16, wherein the list of index page types includes a table of contents.

18. The computer program product of claim 15, wherein the list of index page types includes a table of contents.

19. The computer program product of claim 15, wherein the list of index page types includes a bibliographic index.

20. The computer program product of claim 19, wherein index line types in said list of index line types represent different sources of bibliographic information.

21. The computer program product of claim 15, wherein the at least one token is a tabulator token and said user selectable attributes include tabulator positions.

22. A system comprising:
    a processor;
    a memory coupled to said processor, and having stored therein computer instructions for a method of interactively generating an index page wherein upon execution of said computer instructions on said processor, said method comprises:
        displaying a window including a list of index page types wherein said index page types include at least a table of contents and a bibliography;
        displaying a window including a list of index line types for one index page type upon selection of said one index page type in said list of index page types;
        displaying a token string including a plurality of tokens for one index line type, upon selection of said one index line type in said list of index line types, wherein said plurality of tokens includes only tokens appropriate for said one index line type; and
        displaying, for at least one token in said plurality of tokens, user selectable attributes for data associated with said at least one token.

* * * * *